(12) United States Patent
Euler-Rolle

(10) Patent No.: US 11,320,015 B2
(45) Date of Patent: May 3, 2022

(54) VIBRATION DAMPER

(71) Applicant: Thomas Euler-Rolle, Vienna (AT)

(72) Inventor: Thomas Euler-Rolle, Vienna (AT)

( * ) Notice: Subject to any disclaimer, the term of this patent is extended or adjusted under 35 U.S.C. 154(b) by 0 days.

(21) Appl. No.: 16/960,864

(22) PCT Filed: Feb. 5, 2019

(86) PCT No.: PCT/AT2019/060043
§ 371 (c)(1),
(2) Date: Jul. 8, 2020

(87) PCT Pub. No.: WO2019/148231
PCT Pub. Date: Aug. 8, 2019

(65) Prior Publication Data
US 2021/0079972 A1    Mar. 18, 2021

(30) Foreign Application Priority Data
Feb. 5, 2018  (AT) .............................. A 50022/2018

(51) Int. Cl.
*F16F 9/30* (2006.01)
*F16F 1/373* (2006.01)
*F16F 1/42* (2006.01)

(52) U.S. Cl.
CPC ............ *F16F 9/306* (2013.01); *F16F 1/3737* (2013.01); *F16F 1/42* (2013.01); *F16F 2236/12* (2013.01)

(58) Field of Classification Search
CPC .. F16F 9/306; F16F 1/3737; F16F 1/42; F16F 3/093; F16F 2236/12

USPC ....................................................... 267/141.1
See application file for complete search history.

(56) References Cited

U.S. PATENT DOCUMENTS

| 3,434,708 | A | * | 3/1969 | Hawk, Jr. | ............... | F16F 1/406 |
| | | | | | | 267/293 |
| 3,904,226 | A | * | 9/1975 | Smalley | ................ | F16F 1/3713 |
| | | | | | | 280/486 |
| 4,085,832 | A | | 4/1978 | Gaines et al. | | |

(Continued)

FOREIGN PATENT DOCUMENTS

| CN | 206397831 U | 8/2017 |
| CN | 206513758 U | 9/2017 |

(Continued)

OTHER PUBLICATIONS

ISA European Patent Office, International Search Report Issued in Application No. PCT/AT2019/060043, dated Apr. 25, 2019, WIPO, 3 pages.

(Continued)

*Primary Examiner* — Bradley T King
*Assistant Examiner* — San M Aung
(74) *Attorney, Agent, or Firm* — McCoy Russell LLP

(57) ABSTRACT

The invention relates to a vibration damper, comprising: a housing, which has a first housing element and a second housing element; a first pin element for connecting to a first plate part; a second pin element for connecting to a second plate part; a first damping insert between the first pin element and the second pin element; a second damping insert between the first pin element and the first housing element; and a third damping insert between the second pin element and the second housing element.

17 Claims, 7 Drawing Sheets

(56) References Cited

U.S. PATENT DOCUMENTS

| | | | | | |
|---|---|---|---|---|---|
| 4,214,738 | A | * | 7/1980 | Casper | F16F 1/3732 |
| | | | | | 248/573 |
| 5,433,423 | A | * | 7/1995 | Whightsil, Sr. | E21B 19/006 |
| | | | | | 267/141.1 |
| 5,895,013 | A | * | 4/1999 | Towfiq | B64C 1/40 |
| | | | | | 244/119 |
| 5,927,699 | A | * | 7/1999 | Nakajima | F16F 13/14 |
| | | | | | 267/140.14 |
| 6,260,873 | B1 | * | 7/2001 | Bishel | B60D 1/145 |
| | | | | | 267/138 |
| 2006/0255516 | A1 | | 11/2006 | Dickson et al. | |
| 2012/0049424 | A1 | * | 3/2012 | Bradshaw | F16F 13/262 |
| | | | | | 267/140.14 |

FOREIGN PATENT DOCUMENTS

| | | | |
|---|---|---|---|
| DE | 467711 | C | 10/1928 |
| EP | 0055824 | A1 | 7/1982 |
| EP | 0351738 | A2 | 1/1990 |
| EP | 1184211 | A2 | 3/2002 |
| GB | 1233547 | A | 5/1971 |
| JP | 2014163216 | A | 9/2014 |
| JP | 2015072062 | A | 4/2015 |
| WO | 2012079342 | A1 | 6/2012 |

OTHER PUBLICATIONS

China National Intellectual Property Administration, Office Action and Search Report Issued in Application No. 201980010806.X, dated Mar. 11, 2021, 18 pages.

* cited by examiner

VIBRATION DAMPER

CROSS-REFERENCE TO RELATED APPLICATIONS

The present application is a U.S. National Phase of International Patent Application Serial No. PCT/AT2019/060043 entitled "VIBRATION DAMPER," filed on Feb. 5, 2019. International Patent Application Serial No. PCT/AT2019/060043 claims priority to Austrian Patent Application No. GM 50022/2018 filed on Feb. 5, 2018. The entire contents of each of the above-referenced applications are hereby incorporated by reference for all purposes.

TECHNICAL FIELD

The present invention relates to a vibration damper comprising a housing, which has a first housing element and a second housing element; a first pin element for connection to a first plate part; and a second pin element for connection to a second plate part.

BACKGROUND AND SUMMARY

Vibration dampers are known in a wide variety of designs in the prior art. Such vibration dampers can be used to damp mechanical vibrations (vibrations, shocks, impacts). However, the known vibration dampers entail various disadvantages. In many cases, different vibration dampers must be provided for asymmetrical loads. The dissipation of heat is often not solved satisfactorily either.

Accordingly, the object of the present invention consists in moderating or overcoming at least some disadvantages of the prior art.

The invention aims to create a vibration damper of the type in question which has variable possibilities for use and in particular can absorb different vibrations on both sides. The dissipation of heat should also be improved.

This object is achieved by a vibration damper having the features of claim 1. Preferred embodiments are specified in the dependent claims.

In the vibration damper according to the invention, a first damping insert is provided between the first and second pin elements, a second damping insert is provided between the first pin element and the first housing element, and a third damping insert is provided between the second pin element and the second housing element.

Accordingly, at least three damping inserts are provided. The first damping insert is situated between the first and second pin elements, as seen in the direction of the longitudinal axes of the first and second pin elements, the top of the first damping insert being in contact with the first pin element, and the bottom of the second damping insert being in contact with the second pin element. Furthermore, the second damping insert is provided on the inside of the first, upper housing element, and the third damping insert is provided on the inside of the second, lower housing element.

For the purposes of this disclosure, the position and direction information such as "one above the other", "top", "bottom" etc. relate to a use condition of the vibration damper with a vertical orientation of the longitudinal axes of the first and second pin elements. Of course, the vibration damper can also be used in a different spatial position, in which case the position and direction information should be transferred correspondingly.

Preferably, the first and/or second pin element comprises a pin head which bears horizontally against the first damping insert and is connected to a threaded stem emerging from the housing. The pin element is preferably formed by a pan-head screw for a lightweight and compact structure which is inexpensive to manufacture.

Preferably, the first, second and/or third damping inserts can advantageously differ from one another in material properties and/or dimensions. Firstly, vibrations of differing intensity can be compensated at the pin elements thereby. Secondly, different types of load such as tensile load, compressive load, shear load and torsional load can be absorbed.

In one variant, the pin elements are arranged substantially perpendicular to the first damping insert, which is preferably arranged substantially parallel to the second and/or third damping insert. The pin elements preferably protrude in opposite directions from through-openings in the housing, as seen in the axial direction. The protruding sections of the pin elements are used for fastening to two parts to absorb their vibrations and to transmit said vibrations to the damping inserts.

The pin elements preferably comprise bushings, which project through the through-openings in the housing. During assembly, the bushings can be designed as spacers between the vibration damper and the parts.

The second and/or third damping insert preferably comprises through-holes with which the pin elements are held in position. The through-holes in the damping inserts preferably comprise a smaller diameter than the through-openings in the housing elements.

For a lightweight and compact structure which is inexpensive to manufacture, the housing which holds the pin elements and damping inserts together and accommodates them in its interior comprises two halves, specifically the first and second housing elements, which are connected to each other by suitable fastening elements, for example blind rivets, when the vibration damper is in the assembled condition.

In a preferred variant, the second damping insert is different from the third damping insert. Accordingly, the second damping insert of this variant comprises different material properties than the third damping insert in order to counteract different vibrations.

Preferably, the second damping insert is harder than the third damping insert, therefore comprises a higher Shore A hardness. In this embodiment, the second damping insert can be designed for example for compensating or reducing low-frequency vibrations, and the third damping insert can be designed for compensating and reducing higher-frequency vibrations.

According to a preferred variant, the first and/or second and/or third damping inserts comprise a gel pad.

According to a preferred variant, the first and/or second and/or third damping inserts each comprise a gel pad and two damping plates on either side of the gel pad. Advantageously, the gel pad effects a viscoelastic behaviour between the two damping plates in addition to the substantially elastic behaviour resulting from the damping plates. The gel pad is preferably in the form of a plate.

Preferably, the gel pad is formed from a material with highly viscous properties which can be adapted to the speeds of the parts involved depending on the loading situation.

In a preferred arrangement, the damping plates are formed from a synthetic rubber, in particular acrylonitrile-butadiene rubber (NBR), or natural rubber or EPDM (ethylene-propylene-diene rubber). Acrylonitrile-butadiene rubber (NBR), in addition to its elasticity, also comprises excellent swelling resistance to various lubricants or fuels such as diesel or petrol which can appear when the vibration damper according to the invention is used.

In a preferred variant, the first pin element comprises first inner cooling elements and/or the second pin element comprises second inner cooling elements. Advantageously, better dissipation and regulation of the friction heat resulting from the vibrations can be achieved thereby.

Preferably, the first and/or second inner cooling elements comprise cooling fins to enlarge the surface area of the inner cooling elements and to increase the resulting improved dissipation of heat to the environment. The resulting friction heat can thus be regulated and dissipated in a favourable way. The cooling fins of the inner cooling elements preferably comprise U-shaped cut-outs to expose bores for fastening elements between the housing elements.

For heat dissipation, it has been found advantageous if the first inner cooling elements and/or the second inner cooling elements protrude from the outer circumference of the pin head of the first or second pin elements.

In a particularly preferred embodiment, the first and/or second inner cooling elements extend from the outer circumference of the pin head of the first or second pin elements to the inside of the housing. This achieves a maximum surface area of the inner cooling element, as a result of which the transmission of heat to the environment is optimised.

Preferably, an interstice formed by the inner cooling elements, damping inserts and the insides of the housing elements comprises a cooling medium, for example a liquid having viscous, in particular highly viscous properties. This cooling medium both improves the heat dissipation and additionally supports the damping behaviour.

For improved dissipation and regulation of the friction heat resulting from the vibrations, the first housing element comprises outwardly protruding first outer cooling elements and/or the second housing element comprises outwardly protruding second outer cooling elements. The cooling fins of the outer cooling elements preferably comprise circular cut-outs in the region of bores for fastening elements between the housing elements. In this design, the cut-outs are used for simple attachment of the fastening elements.

In a particularly preferred embodiment, the first and/or second outer cooling elements extend substantially over the entire outer circumference of the housing.

Preferably, the first housing element and the second housing element comprise cut-outs for a plug connection, wherein the first housing element comprising first outer cooling elements with cut-outs, and the second housing element comprising second outer cooling elements with cut-outs.

BRIEF DESCRIPTION OF THE FIGURES

The invention is explained in more detail below using a preferred exemplary embodiment in the drawings.

DETAILED DESCRIPTION

Figure 1:
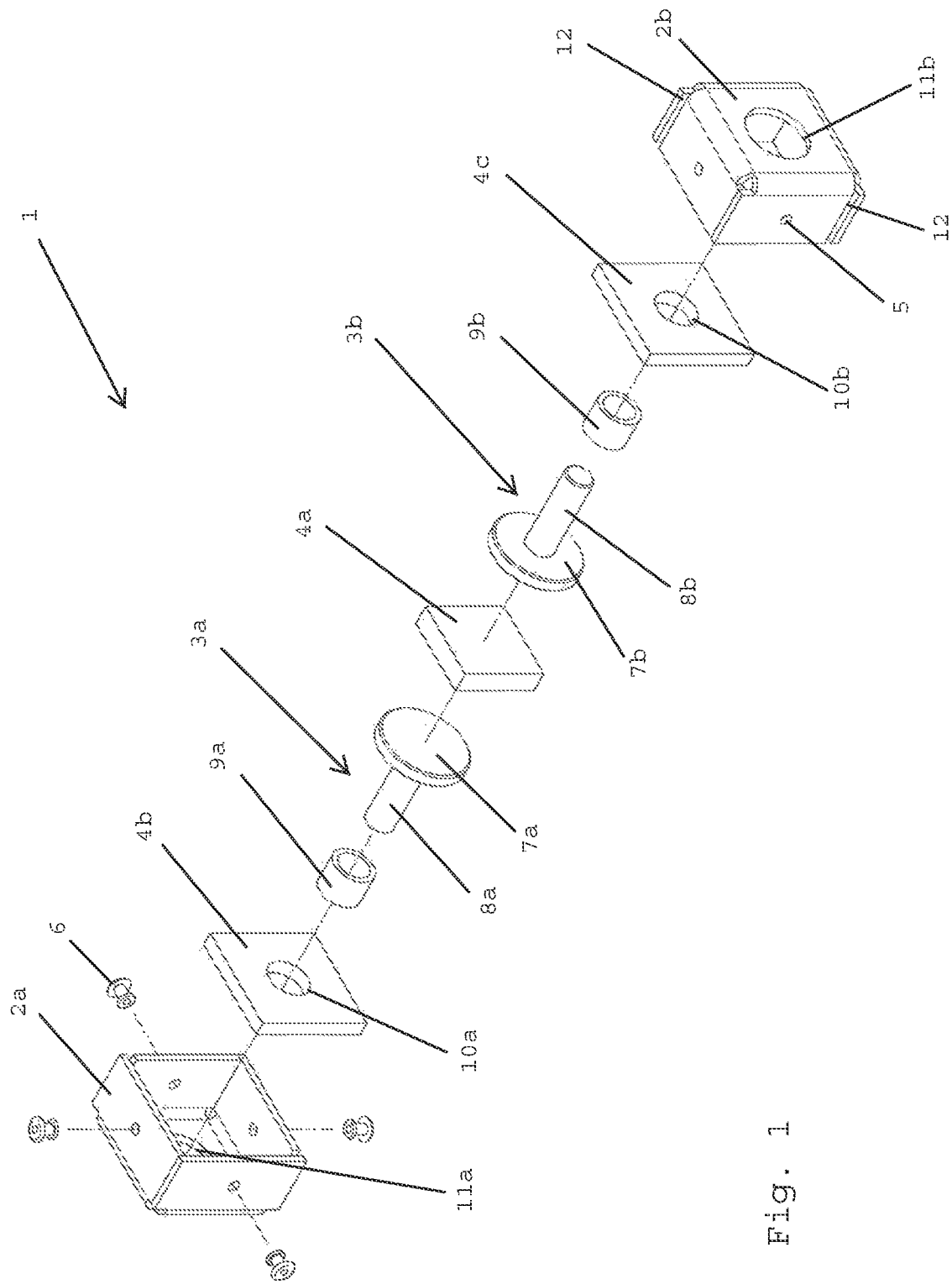
FIG. 1 shows a vibration damper according to the invention in an exploded view.

FIG. 1 shows a vibration damper 1, comprising a housing, which has a first housing element 2a and a second housing element 2b; a first pin element 3a; a second pin element 3b; a first damping insert 4a; a second damping insert 4b; and a third damping insert 4c. The first housing element 2a and the second housing element 2b comprise bores 5 in which fastening elements 6 are arranged, which connect the housing elements 2a, 2b to each other. The pin elements 3a, 3b comprise pin heads 7a, 7b and threaded stems 8a, 8b. On the threaded stems 8a, 8b there are bushings 9a, 9b, which pass through through-holes 10a, 10b in the damping inserts 4b, 4c. The housing elements 2a, 2b comprise through-openings 11a, 11b, through which the threaded stems 8a, 8b with the bushings 9a, 9b arranged thereon run in order to be mounted on two parts (not shown). Also visible in the housing elements 2a, 2b are cut-outs 12, via which the two housing elements 2a, 2b are plugged into each other.

Figure 2:
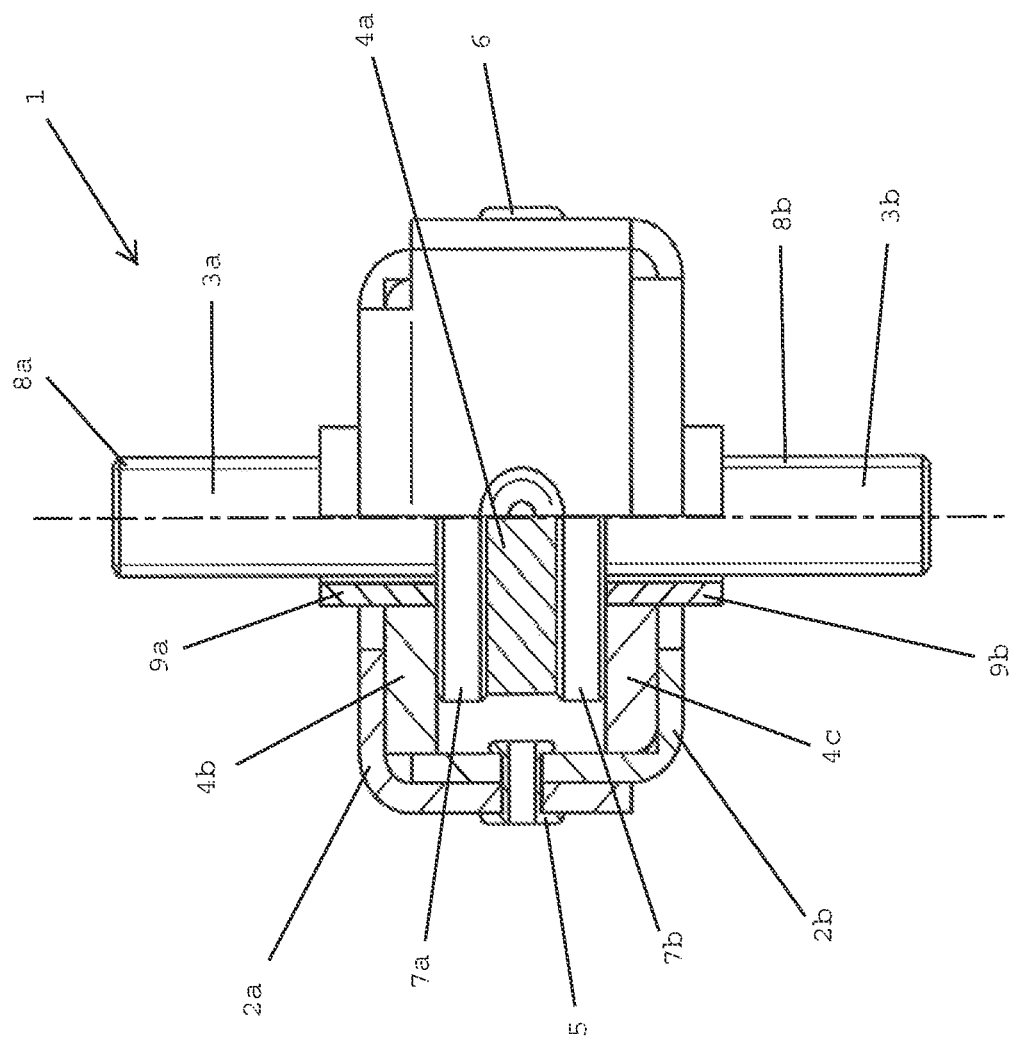
FIG. 2 shows the vibration damper according to FIG. 1 in side view with a half-section along the axis of symmetry.

FIG. 2 shows the vibration damper 1 with the housing elements 2a, 2b assembled. The first damping insert 4a bears over its full area against the pin head 7a at the top and against the pin head 7b at the bottom. The second damping insert 4b bears over its full area against the inside of the first housing element 2a. The third damping insert 4c bears over its full area against the inside of the second housing element 2b.

Figure 3:
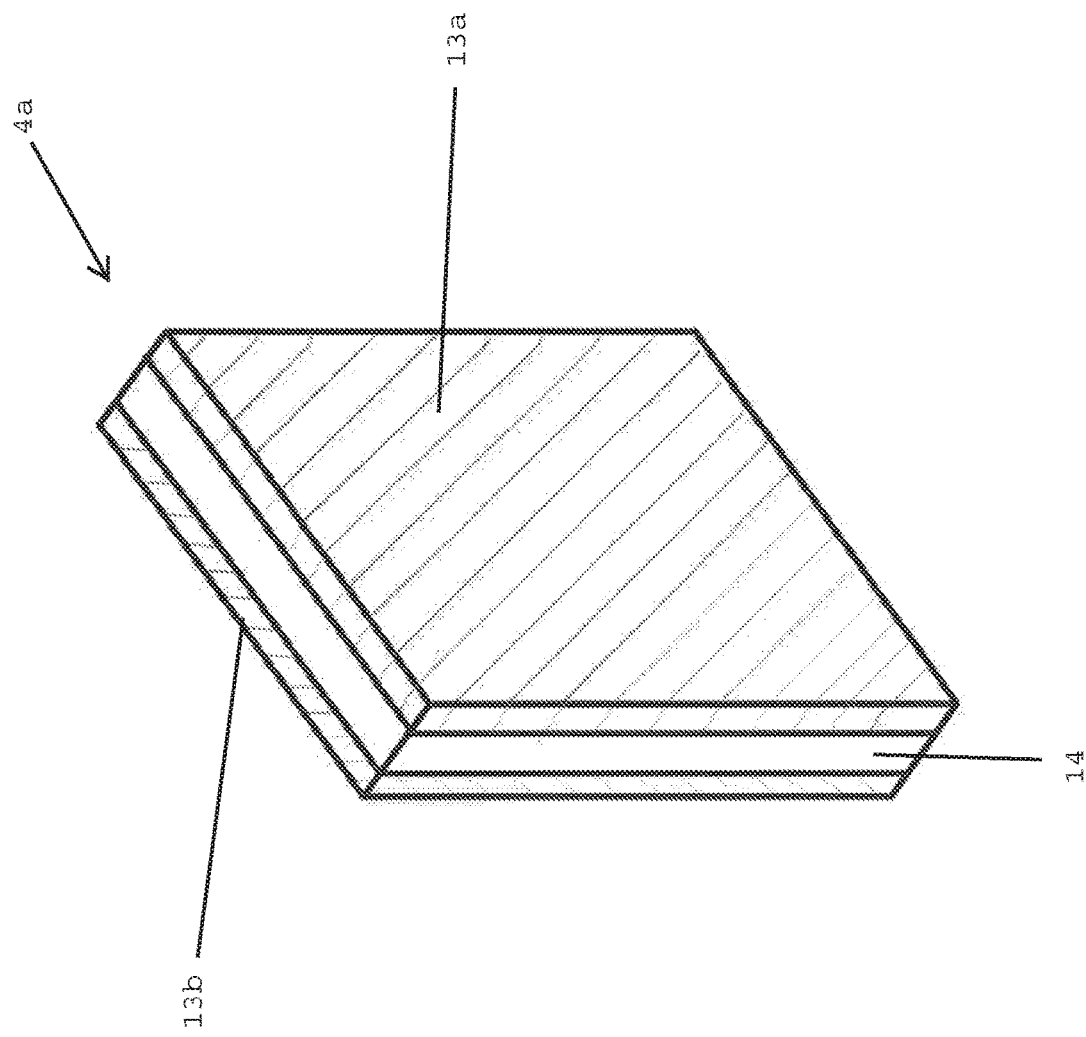
FIG. 3 shows a first damping insert of the vibration damper of FIGS. 1 and 2 in side view.

FIG. 3 shows a design of the first damping insert 4a in which two damping plates 13a, 13b hold a gel pad 14 between them. The second damping insert 4b and the third damping insert 4c can be constructed accordingly (not shown).

Figures 4A, 4B:
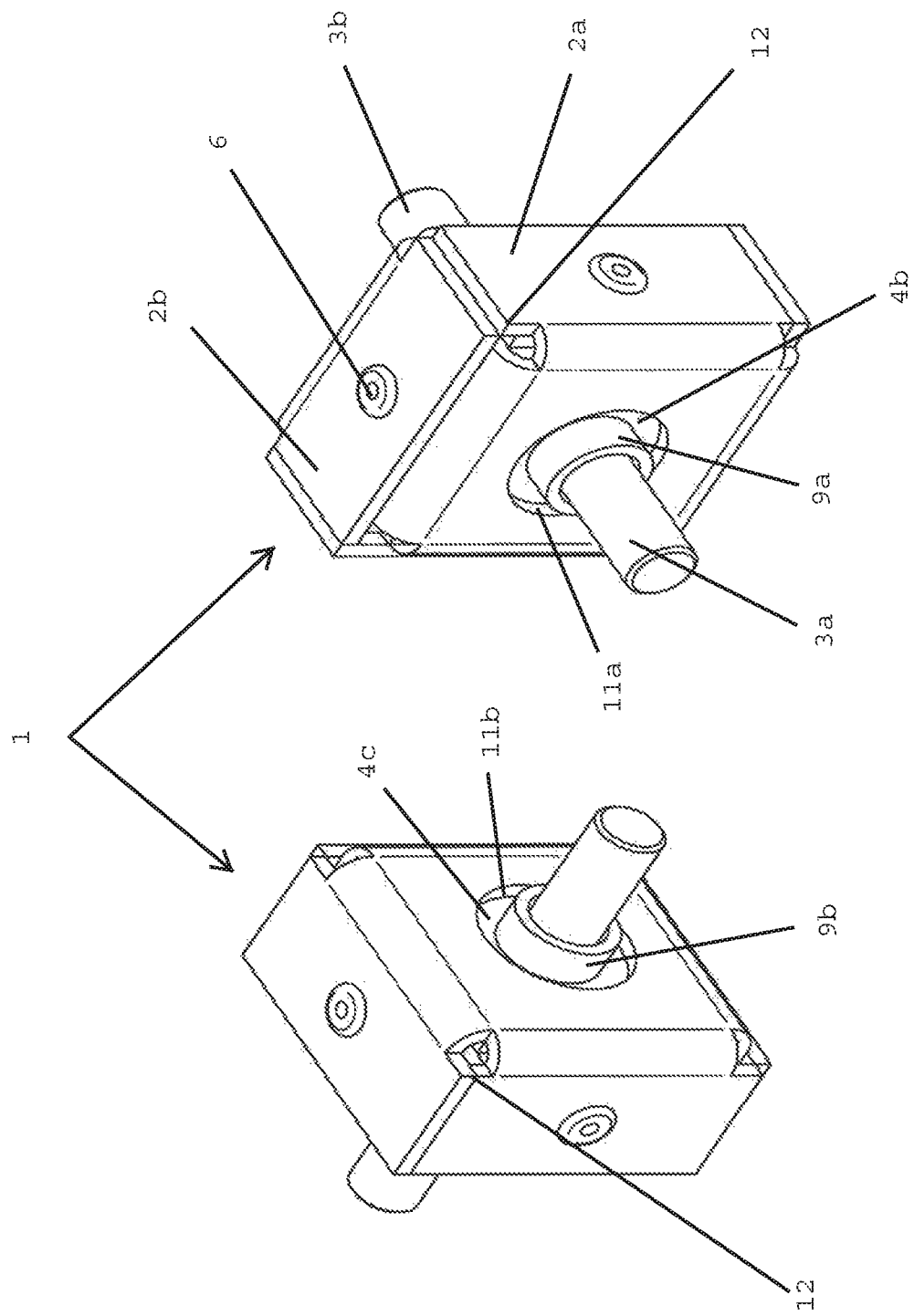
FIGS. 4A and 4B each show the vibration damper according to FIGS. 1 and 2 in an assembled side view.

FIGS. 4a and 4b each show the vibration damper 1 with the housing elements 2a, 2b plugged into each other in the region of the cut-outs 12 and connected to each other by the fastening elements 6.

Figure 5:
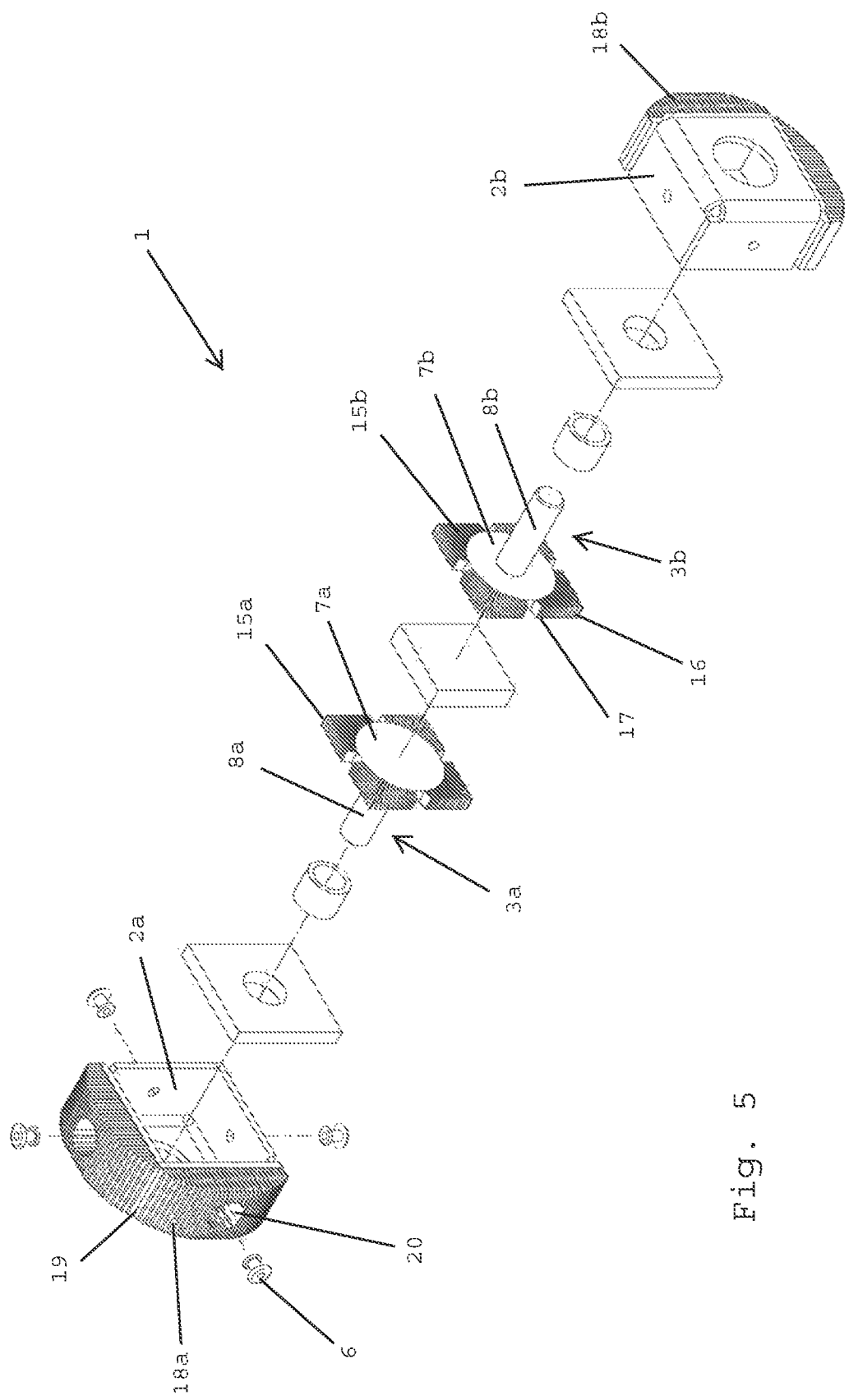
FIG. 5 shows a further embodiment of the vibration damper with inner and outer cooling elements, in a lateral, exploded view.

FIG. 5 shows a design of the vibration damper 1 in which the first pin element 3a and second pin element 3b comprise first inner cooling elements 15a and second inner cooling elements 15b, respectively, around the outer circumference of the first pin head 7a and the second pin head 7b, respectively. The inner cooling elements 15a, 15b are formed by cooling fins 16. In the design shown, the inner cooling elements 15a, 15b comprise cut-outs 17 in the region of the bores 5. The first housing element 2a and the second housing element 2b comprise outwardly protruding first outer cooling elements 18a and outwardly protruding second outer cooling elements 18b. The outer cooling elements 18a, 18b comprise cooling fins 19 which comprise cut-outs 20 in the region of the bores 5 of the housing elements 2a, 2b. The fastening elements 6 are arranged in the cut-outs 20 when the housing elements 2a, 2b are in the assembled condition.

Figure 6:
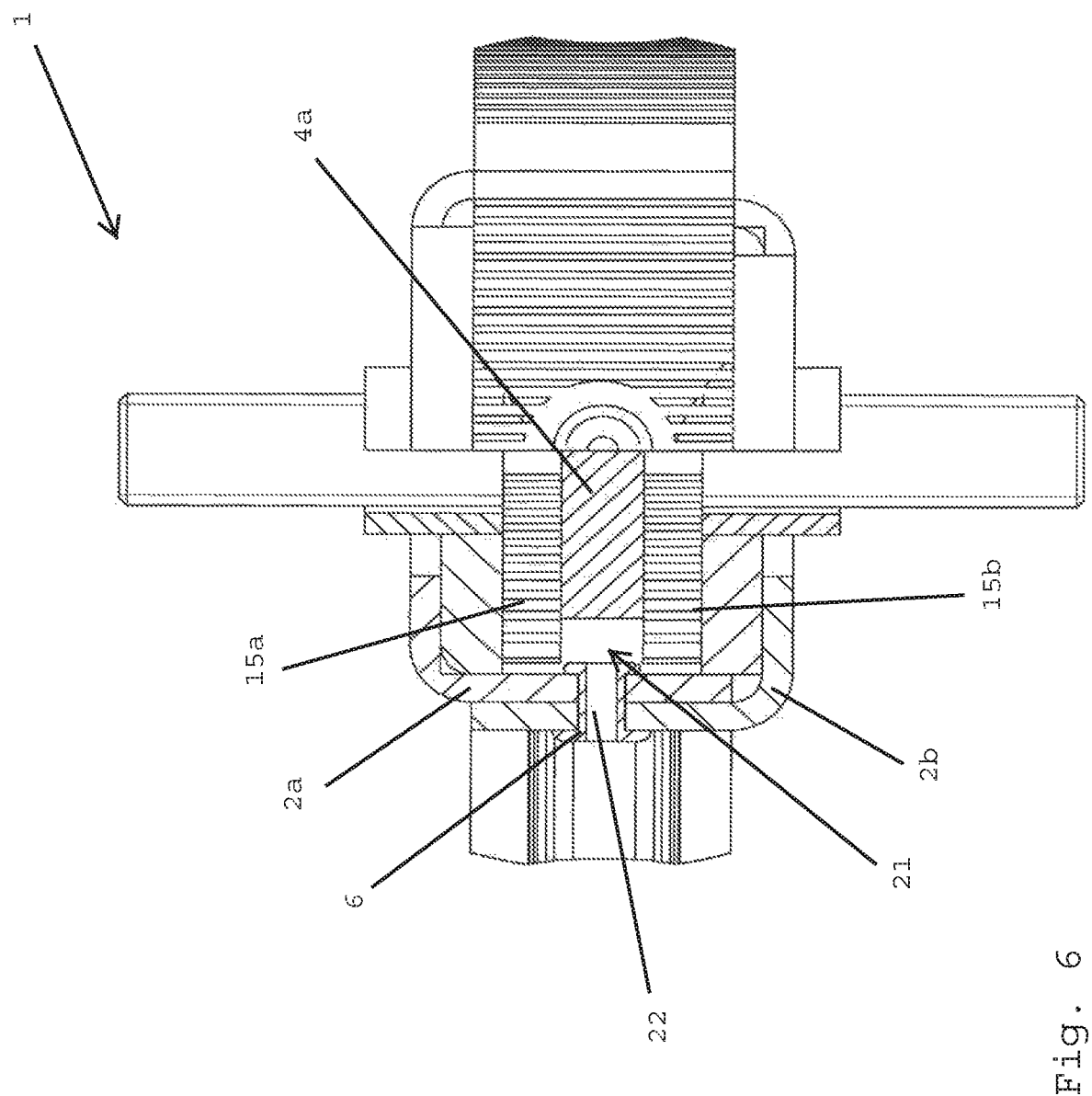
FIG. 6 shows the vibration damper according to FIG. 5 in side view with a half-section along the axis of symmetry.

FIG. 6 shows the vibration damper 1 of FIG. 5 with the first inner cooling element 15a and the second inner cooling element 15b, which are arranged on the outer circumference of the pin heads 7a, 7b of the pin elements 3a, 3b. The inner cooling elements 15a, 15b extend as far as the inside of the housing elements 2a, 2b. An interstice 21 is formed by the inner cooling elements 15a, 15b, the damping inserts 4a, 4b, 4c, the fastening elements 6 and the inner walls of the housing elements 2a, 2b. The interstice 21 contains a cooling medium 22.

Figure 7:
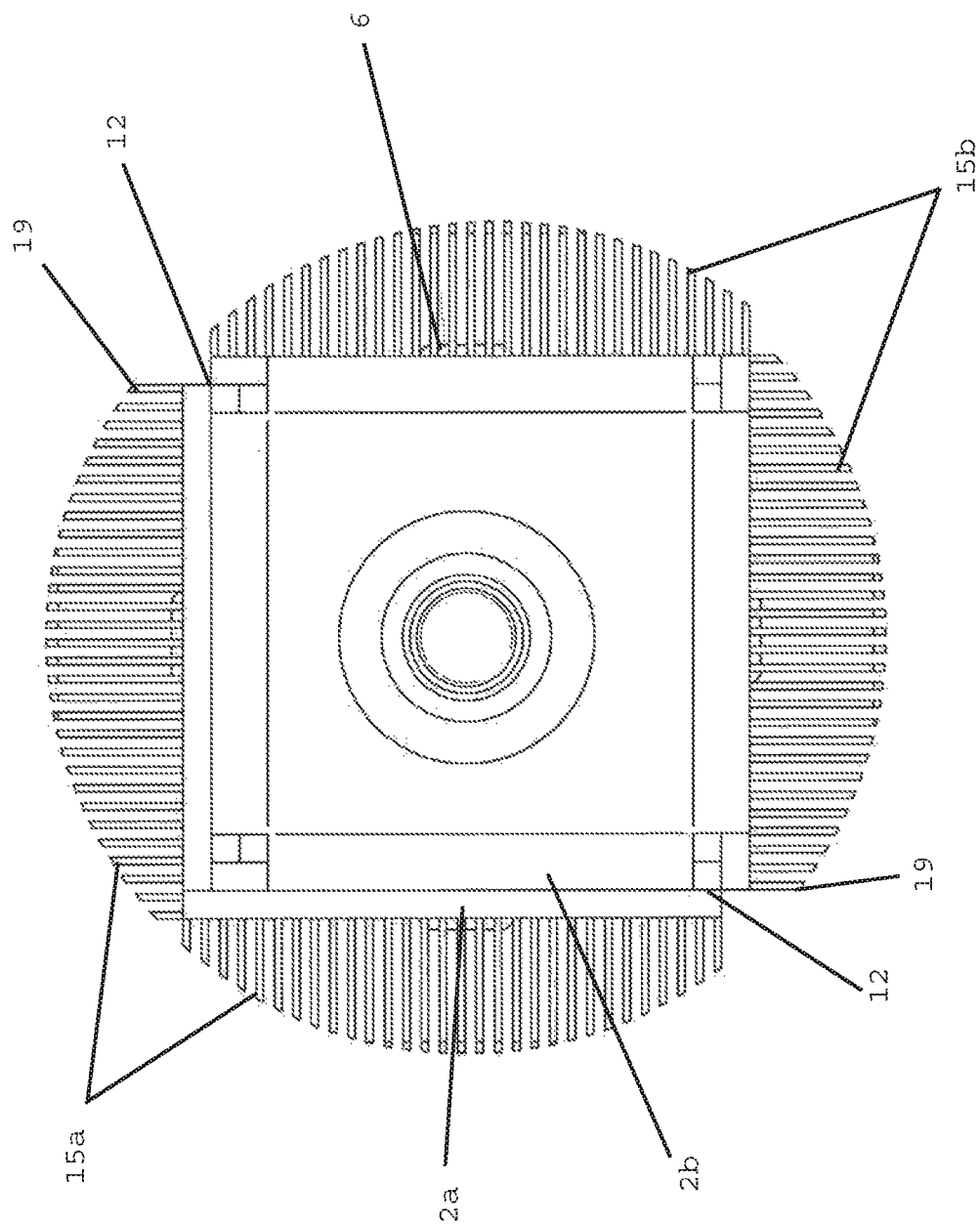
FIG. 7 shows the vibration damper according to FIGS. 5 and 6 in a front view.

As can be seen in FIG. 7, the vibration damper 1 comprises housing elements 2a, 2b plugged into each other in the cut-outs 20, wherein the first outer cooling elements 15a with the cooling fins 19 being arranged on the first housing element 2a, and the second outer cooling elements 15b with the cooling fins 19 being arranged on the second housing element 2b, and the outer cooling elements 15a, 15b extending substantially over the entire outer circumference of the housing formed from the housing elements 2a, 2b.

The invention claimed is:

1. A vibration damper, comprising:
a housing, which has a first housing element and a second housing element,
a first pin element for connection to a first plate part,
a second pin element for connection to a second plate part, wherein
a first damping insert between the first pin element and the second pin element,
a second damping insert between the first pin element and the first housing element, and
a third damping insert between the second pin element and the second housing element, wherein
the first damping insert and/or the second damping insert and/or the third damping insert each comprise a gel pad and two damping plates on either side of the gel pad, and
the first housing element comprises outwardly protruding first outer cooling elements and/or the second housing element comprises outwardly protruding second outer cooling elements.

2. The vibration damper according to claim 1, wherein the second damping insert differs from the third damping insert in material properties and/or dimensions.

3. The vibration damper according to claim 2, wherein the second damping insert has a Shore A hardness greater than the third damping insert.

4. The vibration damper according to claim 1, wherein the gel pad comprises highly viscous material properties.

5. The vibration damper according to claim 1, wherein the damping plates are formed from a synthetic rubber, in particular acrylonitrile-butadiene rubber (NBR), or natural rubber or EPDM (ethylene-propylene-diene rubber).

6. The vibration damper according to claim 1, wherein the first pin element comprises first inner cooling elements and/or the second pin element comprises second inner cooling elements.

7. The vibration damper according to claim 6, wherein cooling fins are provided in each case as the first inner cooling elements and/or second inner cooling elements.

8. The vibration damper according to claim 1, wherein the first pin element and/or second pin element each comprise a pin head which bears against the first damping insert.

9. The vibration damper according to claim 8, wherein the first inner cooling elements and/or the second inner cooling elements protrude from an outer circumference of the pin head of the first pin element and second pin element, respectively.

10. The vibration damper according to claim 9, wherein the first inner cooling elements extend from the outer circumference of the pin head of the first pin element and second pin element, respectively, to the inside of the housing.

11. The vibration damper according to claim 1, wherein the first outer cooling elements and/or second outer cooling elements extend substantially over an entire outer circumference of the housing.

12. The vibration damper according to claim 11, wherein the first housing element and the second housing element are plugged into each other, wherein the first outer cooling elements are situated on the first housing element and the second outer cooling elements are situated on the second housing element.

13. A vibration damper, comprising:
a housing comprising a first housing element and a second housing element;
a first pin element including a first head positioned within the housing;
a second pin element including a second head positioned with the housing;
inner cooling elements protruding from first head and inner cooling elements protruding from second head; and
a first damping insert including a gel pad and two damping plates on either side of the gel pad, the first damping insert positioned between the first head and the second head,
wherein the first housing element comprises outwardly protruding first outer cooling elements and/or the second housing element comprises outwardly protruding second outer cooling elements.

14. The vibration damper of claim 13, where the first housing element is coupled to the second housing element via fastening elements.

15. The vibration damper of claim 13, further comprising a first through hole in the first housing element and a second through hole in the second housing element.

16. The vibration damper of claim 15, further comprising a first bushing and a second bushing.

17. The vibration damper of claim 16, where the first bushing projects through the first through hole, and where the second bushing projects through the second through hole.

* * * * *